United States Patent
Reinsch

[15] 3,705,764
[45] Dec. 12, 1972

[54] MOTION PICTURE CAMERA FOR THE MAKING OF EXPOSURES WITH FIXED AND VARIABLE EXPOSURE TIMES

[72] Inventor: Herbert Reinsch, Kongen, Germany

[73] Assignee: Robert Bosch Pholokino GmbH, Stuttgart, Germany

[22] Filed: Nov. 29, 1971

[21] Appl. No.: 202,761

[30] Foreign Application Priority Data

Dec. 5, 1970 Germany..................P 20 60 026.4

[52] U.S. Cl. ..................352/121, 352/137, 352/141, 352/169
[51] Int. Cl............................................G03b 17/46
[58] Field of Search...............352/121, 137, 169, 141

[56] References Cited

UNITED STATES PATENTS

| | | | |
|---|---|---|---|
| 3,238,008 | 3/1966 | Krumbein | 352/169 |
| 2,472,299 | 6/1949 | Jerome | 352/169 |
| 3,432,228 | 3/1969 | Hellmund | 352/131 X |
| 3,489,492 | 1/1970 | Kobler | 352/137 X |

Primary Examiner—Samuel S. Matthews
Assistant Examiner—Monroe H. Hayes
Attorney—Michael S. Striker

[57] ABSTRACT

A motion picture camera wherein the shutter is adjustable by a knob between a first position in which it shields the film from scene light upon completion of each of its cycles and a second position in which it exposes the foremost unexposed film frame to scene light upon completion of each cycle. The film is transported by an intermittent which is driven by a motor serving to move the shutter through a cycle during each transport of the film by the length of a frame. When the shutter is adjusted to assume its second position, the motor is operated by an electric timer which transmits signals for energization of an electromagnet at intervals whose length is a function of scene brightness. The armature of the electromagnet starts the motor which causes the intermittent to advance the film by the length of a frame and which also causes the shutter to complete a cycle in response to each energization of the electromagnet. This enables the camera to make any desired number of successive time lapse exposures with "long" exposure times (e.g., in the range of one or more seconds or minutes), always as a function of scene brightness.

13 Claims, 2 Drawing Figures

PATENTED DEC 12 1972

3,705,764

INVENTOR
Herbert REINSCH
BY
his ATTORNEY

MOTION PICTURE CAMERA FOR THE MAKING OF EXPOSURES WITH FIXED AND VARIABLE EXPOSURE TIMES

BACKGROUND OF THE INVENTION

The present invention relates to motion picture cameras in general, and more particularly to improvements in motion picture cameras which are designed to make normal or "short" exposures with fixed exposure time and so-called "long" exposures with variable exposure time. In such cameras, the blade or blades of the shutter can assume a position in which the shutter admits scene light while it is held at a standstill upon completion of a cycle so that the foremost unexposed film frame can be exposed to scene light for as long as the shutter is at a standstill. The film is transported by the length of a frame simultaneously with movement of the shutter through a cycle between successive "long" exposures.

In presently known motion picture cameras which are designed to make normal or "short" exposures with a predetermined exposure time and at a preselected frequency (such as 16 or 24 frames per second) and "long" exposures, the duration of each "long" exposure must be determined by the user, either directly or indirectly. Thus, it is already known to provide such cameras with an electronic shutter controlling device which can be adjusted to terminate a "long" exposure after the elapse of a preselected interval of time. As a rule, the user of the camera will make "long" exposures in twilight, at night and/or under other circumstances when the intensity of scene light is low so that it is necessary to make exposures with long exposure times, often in the range of one or more seconds or even one or more minutes. A "long" exposure is started upon completed transport of the film by the length of a frame by moving the shutter to a position in which the shutter admits scene light to the foremost unexposed film frame, and such "long" exposure is terminated by causing the shutter to move through a cycle so as to overlie the light-admitting aperture while a pull-down or a like mechanism transports the film by the length of a frame.

A drawback of presently known motion picture cameras which are designed to make "long" exposures is that the user of the camera must estimate the e optimum exposure time and that the aforementioned electronic control device for the shutter must be reset prior to the making of each "long" exposure of the intensity of scene light varies. An estimation of long exposure times for the taking of pictures in twilight or under similar circumstances is highly unreliable so that the user is likely to make a wrong estimate with the result that the picture is either underexposed or overexposed. Moreover, even though the user of a camera which embodies an electronic control device for the shutter is relieved of the task of actuating the camera release prior to the making of each "long" exposure, the user is normally compelled to employ a separate highly sensitive light meter in order to determine, with at least some degree of accuracy, the anticipated optimum exposure time for successive "long" exposures. Such highly sensitive light meters are costly and bulk. Moreover, a beginner or an amateur photographer is not likely to be capable of properly manipulating a complex light meter and/or of properly estimating satisfactory exposure times for the taking of pictures with long exposure times. Still further, the photographer must be on the alert during the making of "long" exposures so as to shorten the exposure time or to select a longer exposure time if the scene brightness changes appreciably during the making of a "long" exposure.

SUMMARY OF THE INVENTION

An object of the invention is to provide a notion picture camera which can make normal as well as "long" exposures and which is constructed and assembled in such a way that it can terminate "long" exposures at the exact moment when the elapsed exposure time is best suited to insure the taking of satisfactory pictures in twilight, at night and/or under similar circumstances when the intensity of seen light is low.

Another object of the invention is to provide a motion picture camera which can make satisfactory "long" exposures even if the intensity of scene light varies, either slightly or substantially, during the making of a "long" exposure.

A further object of the invention is to provide a motion picture camera which can make normal or "short" exposures with a preselected exposure time and at a preselected frequency, as well as any desired number of successive "long" exposures with exposure times which are identical or different, depending on the prevailing scene brightness.

An additional object of the invention is to provide a motion picture camera of the above outlined character with novel and improved control means having component parts which can be used while the camera is in the process of making normal exposures as well as when the camera is set to make "long" exposures.

The invention is embodied in a motion picture camera comprising an intermittent or an analogous mechanism which is operative to intermittently transport the film, always by the length of a frame, a cyclically movable shutter (e.g., a shutter having a single blade) which is adjustable between first and second positions in which it respectively shields the film from and exposes the film to scene light upon completion of each cycle, a knob or analogous selector means for effecting adjustments of the shutter, arresting means for releasably holding the shutter against cyclical movement in the second position of the shutter in which the shutter exposes the foremost unexposed film frame to scene light upon completion of each cycle, drive means which is actuatable to operate the film transporting mechanism and to move the shutter (as well as to effect adjustments of the shutter in response to manipulation of the selector means), and electrical control means including timer means arranged to produce signals at a frequency which is a function of scene brightness and actuating means for temporarily disengaging the arresting means from the shutter (so that the shutter can complete a cycle) and for actuating the drive means (so that the drive means can effect the transport of motion picture film by the length of a frame) in response to each signal from the timer means. Such timer means may comprise photoelectric receiver means which is exposed to scene light and capacitor means which is charged at the rate determined by the receiver means is a function of scene brightness.

In accordance with another feature of the invention, the camera further comprises adjustable diaphragm means, electric adjuster means for the diaphragm means, and switch means (which can be actuated by hand) for connecting the photoelectric receiver means in circuit with the adjuster means in the first position of the shutter so that the size of the aperture furnished by the diaphragm means varies a function of changes in scene brightness when the shutter assumes its first position and the camera is operated in the normal way to make a predetermined number of exposures per unit of time.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
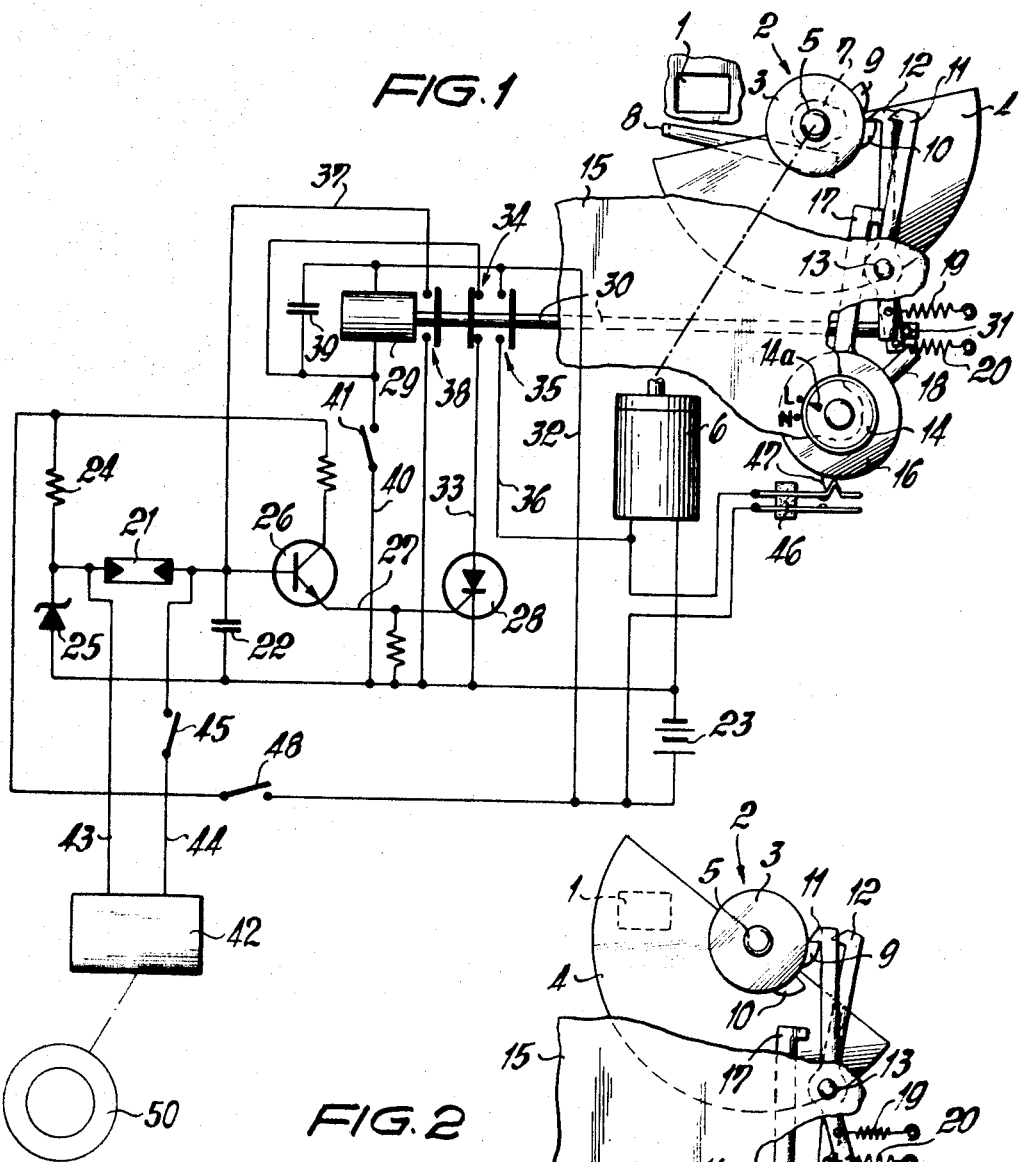
FIG. 1 is a fragmentary diagrammatic view of a motion picture camera which embodies the invention, the camera being set for the making of "long" exposures.

The motion picture camera comprises a housing or body 15 having an internal wall which defines a light-admitting window 1 located on front of the path for motion picture film, now shown. The rotary shutter 2 which is located in front of the window 1 comprises a hub 3 carrying a disk-shaped blade or vane 4. The hub 3 is mounted on a shaft 5 which can be rotated by a drive including an electric motor 6 so as to rotate in a counterclockwise direction, as viewed in FIGS. 1 and 2. The shaft 5 further carries a system of in-out and advancing cams 7 for a claw pull-down 8 which forms part of a film transporting mechanism or intermittent. The claw of the pull-down 8 enters an adjoining perforation of the film behind the window 1 to advance the film by the length of a frame while the window 1 is overlapped by the blade 4, and the blade permits scene light to pass through the window 1 and to impinge on the foremost unexposed film frame when the claw of the pull-down 8 is withdrawn from the perforation and the pull-down performs a return stroke.

The hub 3 of the shutter 2 is provided with two axially and circumferentially spaced projections in the form of teeth 9 and 10 which can be respectively engaged by the pallets of two two-armed arresting levers 11, 12 pivotable about the axis of a common shaft 13 which is mounted in the housing 15.

The arresting lever 11 cooperates with the corresponding tooth 9 to hold the shutter 2 against rotation in an angular position in which the blade 4 completely overlies the window 1 (see FIG. 2) upon completion of each cycle. When the lever 12 engages the tooth 10, the shutter 2 is held against rotation in an angular position in which the blade 4 allows scene light to pass through the entire window 1, see FIG. 1, upon completion of each cycle. Thus, when the pallet of the lever 12 is free to engage the tooth 10, the shutter 2 allows the window 1 to admit scene light to the adjoining film frame for as long as the lever 12 remains in the operative or blocking position of FIG. 1. This enables the camera to make so-called time lapse or "long" exposures with an exposure time of desired length e.g., one or more seconds or one or more minutes. Such exposures will be made in twilight, in complete absence of daylight and/or on certain other occasion.

The arresting lever 11 or 12 can be moved to its operative position by a manually actuatable selector knob 14 which is rotatably mounted on and is accessible from without the housing 15. The knob 14 can rotate a coaxial disk 16 which carries a longer radially extending arm 17 and a shorter radially extending arm 18. When an index 14a on the knob 14 is moved into register with a symbol "N" on the housing 15, the longer arm 18 is disengaged from the upper arm of the lever 11 so that the latter can follow the bias of a helical spring 19 and moves its pallet toward the hub 3 whereby the pallet engages the tooth 9 and holds the shutter 2 against further rotation in a counterclockwise direction. The arm 18 then maintains the lever 12 in the angular position of FIG. 2 in which the lever 12 stresses a helical spring 20 and keeps its pallet away from the path of the tooth 10. The spring 20 is free to pivot the lever 12 to the angular position of FIG. 1 when the knob 14 is rotated to move the index into register with the symbol "L" on the housing 15. The arm 17 then pivots the lever 11 to the inoperative position in which the pallet of the lever 11 is out of the path of the tooth 9 on the hub 3. The symbol "N" indicates that the camera is ready to make normal or "short" exposures, e.g., at a frequency of 16 or 24 frames per second. The symbol "L" indicates that the camera is ready to make "long" exposures with an exposure time which is determined as a function of scene brightness. The disk 16 is mounted in the interior of the housing 15.

The camera is further provided with control means for automatically terminating "long" exposures with a delay which is a function of prevailing scene brightness. This relieves the user of the camera of the task of monitoring the making of exposures and of manually terminating or manually determining the duration of each "long" exposure. Thus, the user need not observe a separate exposure meter in order to calculate the optimum exposure time for a particular scene brightness. The exposure terminating means comprises a photoelectric receiver here shown as a photoresistor 21 which, together with a capacitor 22, constitutes an electric timer serving to energize an actuating device in the form of an electromagnet 29 which, in turn, temporarily disengages the pallet of the arresting lever 12 from the tooth 10 of the hub 3 and simultaneously completes the circuit of the motor 6 so that the shaft 5 rotates the tooth 10 past the pallet of the lever 12 and the cams 7 cause the claw pull-down 8 to advance the film by the length of a frame while the blade 4 overlies the window 1. The duration of energization of the electromagnet 29 in response to a signal from the timer 21–22 is selected in such a way that the motor 6 is capable of rotating the shaft 5 through a full revolution (so that the shutter 2 can move through a cycle) and that the pallet of the lever 12 is ready to reengage the tooth 10 when the shaft 5 completes such revolution. This completes a "long" exposure and immediately starts a fresh "long" exposure, i.e., the capacitor 22 is again charged by way of the receiver 21 at a speed which is a function of scene brightness to energize the electromagnet 29 which disengages the arresting lever 12 from the tooth 10 and starts the motor 6 which rotates the shaft 5 so that the latter causes the pull-down 8 to advance the film by the length of a frame while the blade 4 overlies the window 1.

The control means of the camera further comprises an energy source 23 (e.g., one or more batteries) which is connected with the timer 21–22 by way of a fixed resistor 24 and a voltage stabilizer here shown as a Zener diode 25. The receiver 21 is connected in parallel with the capacitor 22. It will be readily understood that, as the resistance of the receiver 21 varies in dependency on changes in scene brightness, the time required for the charging of capacitor 22 to the extent which is necessary to energize the electromagnet 29 also varies as a function of scene brightness so that the exposure time for each "long" exposure is determined in dependency on the prevailing intensity of scene light.

The output of the timer 21–22 is connected with a transistor 26 which amplifies the discharge current of the capacitor 22. The emitter of the transistor 26 is connected with the gate of a thyristor 28 by means of a conductor 27. The winding of the electromagnet 29 is connected in the anode circuit of the thyristor 28. As shown, the cathode and the anode of the thyristor 28 are respectively connected with the negative and positive poles of the energy source 23.

The electromagnet 29 has a reciprocable armature 30 the right-hand end portion of which carries a diametrically extending motion transmitting pin 31 located to the right of the lower arms of the levers 11 and 12. The winding of the electromagnet 29 is connected with the positive pole of the energy source 23 by a conductor 32, and a further conductor 33 connects the electromagnet 29 with the negative pole of the source 23. The thyristor 28 is connected in the conductor 33, and this conductor further contains a normally closed switch 34 which is opened in response to energization of the electromagnet 29 and the resulting leftward lengthwise displacement of the armature 30. the thyristor 28 is turned off in response to opening of the switch 34.

The armature 30 of the electromagnet 29 further controls a normally open switch 35 which must be closed in order to complete the circuit of the motor 6. The switch 35 is mounted in a conductor 36 which is connected with the winding of the motor 6. It will be seen that the energization of electromagnet 29 results in closing of the switch 35 and starting of the motor 6 so that the latter rotates the shaft 5 and causes the shutter 2 to move through at least one full cycle, depending upon whether the index 14a registers with the symbol "L" or "N".

A short-circuiting switch 38 is connected in a conductor 37 in parallel with the capacitor 22. The movable contact of the switch 38 is normally held in open position by the armature 30. When the electromagnet 29 is energized, the armature 30 closes the switch 38 so that the latter insures complete discharge of the capacitor 22 prior to renewed stoppage of the shaft 5 by the arresting lever 12 when the knob 14 sets the camera for the making of "long" exposures. This ensures that the interval which elapses between successive energizations of the electromagnet 29 is dependent exclusively on scene brightness, i.e., that the time which is required for charging of the capacitor 22 to the extent which is necessary to energize the electromagnet 29 is not influenced by other factors which could possibly lead to the making of unsatisfactory exposures by causing a delayed or premature energization of the electromagnet 29 with attendant completion of a "long" exposure.

In order to prevent premature deenergization of the electromagnet 29, i.e., immediate deenergization of the electromagnet in response to opening of the normally closed switch 34 by the armature 30, the circuit of FIG. 1 further comprises a low-capacity second capacitor 39 which is connected in parallel with the electromagnet 29. When the switch 34 opens in response to leftward movement of the armature 30, the capacitor 39 furnishes a holding current which maintains the electromagnet 29 in energized condition for an interval of time which is necessary to insure that the circuit of the motor 6 remains completed long enough to return the tooth 10 into engagement with the pallet of the arresting lever 12. In other words, the capacitor 39 serves as a means for insuring that, when the camera is set to make "long" exposures, the energization of electromagnet 29 invariably insures that the shaft 5 is rotated through exactly 360° because the illustrated embodiment of the camera employs a shutter blade 4 which defines a single opening and the shaft 5 carries a single tooth 10. The circuit of the motor 6 can be opened shortly before the shutter 2 completes a cycle because the inertia of the shaft 5 and of the parts which rotate therewith then suffices to insure that the tooth 10 engages the pallet of the arresting lever 12.

The making of normal or "short" exposures (when the index 14a registers with the symbol "N") is started in response to closing of a release or starter switch 41. The release switch 41 is connected in a bypass conductor 40 for the conductor 33. This switch is normally open and can be closed by the operator for as long as the camera is to make normal exposures at a predetermined frequency, e.g., 16 or 24 frames per second. Closing of the switch 41 results in energization of the electromagnet 29 which thereby closes the switch 35 in the circuit of the motor 6. Therefore, the motor 6 rotates the shaft 5 at a constant speed and such rotation of the shaft 5 is not obstructed by the arresting levers 11 and 12 because the lever 12 is disengaged from the tooth 10 in response to placing of the index 14a into register with the symbol "N" and the pallet of the lever 11 is moved away from the path of the tooth 9 in response to energization of the electromagnet 29. When the switch 41 is allowed or caused to open, the shaft 5 continues to rotate until the tooth 9 reengages the pallet of the lever 11 so that the shutter 2 comes to a halt in an angular position in which the blade 4 overlies the window 1.

The camera further comprises an adjustable diaphragm 50 which is controlled by an automatic electrical adjuster 42 as a function of scene brightness when the camera is set for the making of "short" exposures. In order to achieve savings in parts, the receiver 21 of the timer 21–22 may be disconnected from the capacitor 22 when the index 14a registers with the symbol "N" and the receiver 21 is then automatically connected in the circuit of the adjuster 42 to determine the aperture size which is furnished by the diaphragm 50 as a function of scene brightness while the exposures are being made at a predetermined frequency and for fixed intervals of time. Thus, the receiver 21 insures that the exposure time varies as a function of changes in scene brightness when the camera is set to make "long" exposures, and the same receiver 21 insures that the size of the aperture furnished by the diaphragm 50 varies as a function of changes in scene brightness when the camera is set to make "short" exposures. The diaphragm 50 furnishes an aperture of fixed size when the camera makes "long" exposures, and the shutter 2 furnishes exposure times of fixed duration when the camera is in the process of making "short" exposures. The adjuster 42 is connected with the receiver 21 by means of two conductors 43, 44 the latter of which contains a switch 45. The switch 45 can be closed by the knob 14 and/or disk 16 in a manner not shown in the drawing to thereby connect the receiver 21 in the circuit of the adjuster 42 when the index 14a is moved into register with the symbol "N".

Figure 2:
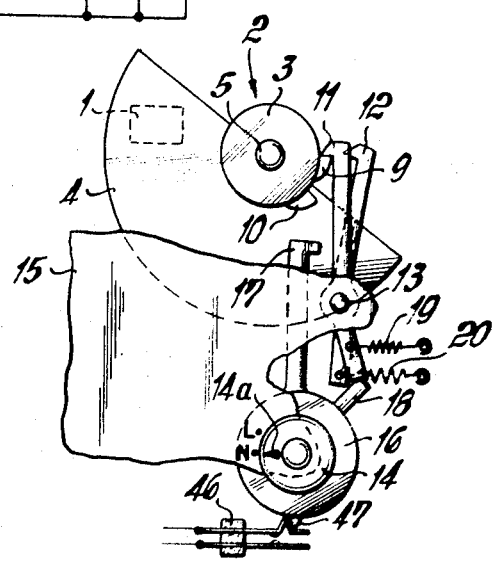
FIG. 2 illustrates a portion of the structure shown in FIG. 1, with the camera set to make normal or "short" exposures.

The disk 16 is further provided with a projection or trip 47 which temporarily closes a switch 46 when the index 14a is moved from register with the symbol "N" into register with the symbol "L" or vice versa. The purpose of the switch 46 is to start the motor 6 for a short interval of time which suffices to insure that the angular position of the shaft 5 is changed in automatic response to movement of the knob 14 from one angular position to the other angular position or vice versa. The switch 46 is connected in parallel with the normally open switch 35, and therefore, its closing results in completion of the circuit of the motor 6 which rotates the shaft 5 in a counterclockwise direction. When the user of the camera moves the knob 14 to the angular position of FIG. 1 in which the arm 17 disengages the pallet of the arresting lever 11 from the tooth 9 and the spring 20 is free to bias the pallet of the arresting lever 12 against the periphery of the hub 3, the motor 6 must rotate the shaft 5 through a relatively small (actuate) angle so that the tooth 9 moves past the pallet of the lever 11 and the tooth 10 moves into engagement with the pallet of the lever 12. If the knob 14 is thereupon moved to the angular position of FIG. 2 in which the pallet of the lever 12 is disengaged from the tooth 10 and the spring 19 is free to bias the pallet of the lever 11 against the periphery of the hub 3, the shaft 5 must be rotated through nearly 360° in order to move the tooth 9 into engagement with the pallet of the lever 11. Such angular movements of the shaft 5 are caused by the motor 6 in response to closing of the switch 46 by the trip 47 on the disk 16, i.e., in response to each manipulation of the knob 14. The Operation is as Follows:

In order to make "short" or normal exposures with a fixed exposure time at a predetermined frequency, the user of the camera moves the index 14a of the selector knob 14 into register with the symbol "N" on the camera body 15 (see FIG. 2). The user thereupon closes the starter or release switch 41 to energize the electromagnet 29 which moves the armature 30 in a direction to the left, as viewed in FIG. 1, and closes the switch 35 to complete the circuit of the motor 6 which starts to drive the shaft 5 and shutter 2. The arresting levers 11 and 12 cannot interfere with rotation of the shaft 5 because the pallet of the lever 12 is held away from the path of the tooth 10 on the hub 3 by the arm 18 of the disk 16 and the pin 31 of the armature 30 holds the pallet of the lever 11 away from the path of the tooth 9. The camera continues to make "short" exposures for as long as the release switch 41 is held in closed position, for example, by the customary trigger which can be mounted on a pistol grip handle of the camera body 15. When the switch 41 is allowed to open, the electromagnet 29 is deenergized and the armature 30 moves the pin 31 in a direction to the right so as to allow the spring 19 to bias the arresting lever 11 in a direction to move its pallet into the path of the tooth 9 on the hub 3. The armature 30 also closes the switch 34 and opens the switches 35, 38. The shutter 2 is arrested in an angular position in which the blade 4 overlies the window 1.

If the camera is to make a series of "long" exposures with exposure times which are a function of scene brightness, the knob 14 is moved to the angular position of FIG. 1 in which the index 14a registers with the symbol "L'." The arm 17 of the disk 16 pivots the arresting lever 11 in a clockwise direction, as viewed in FIG. 1, so that the pallet of the lever 11 is moved away from the path of the tooth 9 and the lever 11 stresses the spring 19. At the same time, the arm 18 allows the spring 20 to bias the arresting lever 12 in a counterclockwise direction, as viewed in FIG. 1, so that the pallet of the lever 12 moves into the path of the tooth 10 on the hub 3. As explained before, the movement of the knob 14 from the position of FIG. 2 to the position of FIG. 1 results in temporary closing of the switch 46 which completes the circuit of the motor 6 so that the latter rotates the shaft 5 in a counterclockwise direction until the tooth 10 engages the pallet of the arresting lever 12.

The user also closes a master switch 48 to connect the capacitor 22 with the energy source 23 whereby the capacitor 22 is being charged at the rate determined by the resistance of the receiver 21, i.e., in dependency on scene brightness. When the charge of the capacitor 22 reaches a predetermined threshold value at which the thyristor is turned on by way of the transistor 26, the cathode-anode circuit of the thyristor 28 becomes conductive so that the capacitor 39 receives current by way of the closed switch 34 and is being charged. As the charge of the capacitor 39 increases, the current flow through the winding of the electromagnet 29 also increases and finally reaches a value at which the electromagnet 29 is energized and moves the armature 30 in a direction to the left to open the switch 34 and close the switches 35, 38. The pin 31 of the armature 30 pivots the arresting lever 12 in a clockwise direction, as viewed in FIG. 1, so that the pallet of the lever 12 is removed from the path of the tooth 10 and the motor 6 can rotate the shaft 5 because the switch 35 is closed. The cams 7 cause the pull-down 8 to advance the film behind the window 1 by the length of a frame while the window 1 is overlapped by the blade 4. The first "long"

exposure is completed with movement of the blade 4 in front of the window 1 and the next "long" exposure begins when the blade 4 returns to the position of FIG. 1, i.e., in response to completion of a full revolution by the shaft 5 and the hub 3. When the electromagnet 29 is energized by the capacitor 39, the switch 38 in the conductor 37 short-circuits the capacitor 22 so that the latter discharges, i.e., that charge which remains in the capacitor 22 after turning off of the thyristor 28 is dissipated prior to deenergization of the electromagnet 29. The thyristor 28 is turned off in response to opening of the switch 34 to thus deenergize the electromagnet 29. However, the deenergization of electromagnet 29 is delayed by the capacitor 39 for an interval of time which suffices to insure that the shaft 5 completes the major part of a full revolution. When the holding current furnished by the capacitor 39 is exhausted, the armature 30 of the electromagnet 29 returns to the position of FIG. 1 and the switch 35 opens to arrest the motor 6. The pin 31 allows the spring 20 to return the pallet of the arresting lever 12 into the path of movement of the tooth 10 so that the lever 12 arrests the hub 3 when the shaft 5 completes a full revolution (i.e., when the shutter 2 completes a cycle). The return movement of armature 30 to the position of FIG. 1 results in opening of the switch 38 and in closing of the switch 34. Since the master switch 48 is assumed to be closed, the charging of the capacitor 22 beings anew at the rate determined by the receiver 21 and the second "long" exposure is completed after elapse of an interval of time which is an function of scene brightness in response to renewed energization of the electromagnet 29. The making of "long" exposures is terminated when the user decides to open the master switch 48.

An important advantage of the improved motion picture camera is that the user need not be concerned with the exposure times when the camera is set to make "long" exposures because the control means of FIG. 1 insures the selection of an optimum exposure time as a function of scene brightness as long as the knob 14 remains in the position shown in FIG. 1. Moreover, the user of the camera need not repeatedly actuate the release; all that is necessary to make a desired number of "long" exposures is to move the knob 14 to the position of FIG. 1 and to close the master switch 48. The camera will continue to make "long" exposures as long as the switch 48 remains closed whereby the intervals between successive "long" exposures do not change at all but the duration of successive "long" exposures may vary from exposure to exposure if the intensity of scene light varies. Consequently, the user can make satisfactory "long" exposures without resorting to a separate light meter because the photosensitive receiver 21 insures the termination of "long" exposures after the elapse of an optimum exposure time for each "long" exposure. The "long" exposures are more reliable than those which can be made with presently known motion picture cameras because it is very difficult to estimate an exposure time of one or more seconds or one or more minutes, especially if the intensity of scene light is likely to change during the making of a "long" exposure. The user of the improved camera need not have any detailed knowledge of the relationship between a satisfactory exposure time and/or aperture size; all the user has to do is properly set the knob 14 and to close the switch 41 or 48, depending upon whether the camera is to make normal exposures or "long" exposures. A proper combination of exposure time and aperture size is selected by the camera in each instance, either by using a fixed exposure time and a variable aperture size (normal exposures) or a fixed aperture size and a variable exposure time ("long" exposures).

In order to insure that the charging of the capacitor 22 begins simultaneously with movement of the blade 4 to its open position in response to movement of the index 14a into register with the symbol "L," the closing of switch 48 can take place simultaneously with such movement of the index 14a. to this end, the knob 14 can be coupled with the switch 48 in any convenient way to insure the closing of the switch 48 simultaneously with the movement of the index 14a into register with the symbol "L." However, even a slightly delayed closing of the switch 48 after the index 14a is moved into register with the symbol "L" is not likely to unduly effect the first "long" exposure because the exposure time for "long" exposures is often in the range of one or more seconds or even one or more minutes. "Long" exposures are normally made by mounting the camera on a tripod or another suitable support. The provision of an operative connection between the knob 14 and the switch 48 to close the latter in response to movement of the index 14a into register with the symbol "L" is an optional but advantageous feature of the improved camera. Thus, if the switch 48 is not closed automatically when the user rotates the knob 14 to the annular position of FIG. 1, the user can still close the switch 48 substantially simultaneously with movement of the shutter blade 4 to its open position because the camera is assumed to be mounted on a tripod so that the operator can use both hands, one to rotate the knob 14 and the other to close the switch 48.

Without further analysis, the forgoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. In a motion picture camera, a combination comprising a mechanism operative to intermittently transport the film by the length of a frame; a cyclically movable shutter, said shutter being adjustable between first and second positions in which the shutter respectively shields the film from and exposes the film to scene light upon completion of each cycle; selector means for effecting adjustments of said shutter; arresting means for releasably holding the shutter against movement in said second position thereof; drive means actuatable to operate said mechanism and to move said shutter; and control means including timer means arranged to produce signals at a frequency which is a function of scene brightness and actuating means for temporarily disengaging said arresting means from said shutter so that the latter can complete a cycle and for actuating said drive means so that the latter can effect the transport of film by the length of a frame in response to each of said signals.

2. A combination as defined in claim 1, wherein said timer means comprises photoelectric receiver means exposed to scene light and capacitor means which is charged at the rate determined by said receiver means as a function of scene brightness.

3. A combination as defined in claim 2, further comprising adjustable diaphragm means, electric adjuster means for said diaphragm means, and switch means for connecting said photoelectric receiver means in circuit with said adjuster means in the first position of said shutter so that the size of the aperture furnished by said diaphragm means varies as a function of changes in scene brightness.

4. A combination as defined in claim 3, wherein said switch means is actuatable by hand.

5. A combination as defined in claim 1, wherein said control means further comprises a thyristor having an anode and a gate, said actuating means being connected in the anode circuit of said thyristor and said timer means being arranged to transmit said signals to the gate of said thyristor.

6. a combination as defined in claim 5, wherein said control means further comprises normally closed switch means in the anode circuit of said thyristor, said switch means being arranged to open and to turn off said thyristor in response to each of said signals.

7. A combination as defined in claim 6, wherein said switch means is opened by said actuating means.

8. A combination as defined in claim 1, wherein said actuating means comprises an electromagnet which is energized in response to said signals and comprises an armature arranged to disengage said arresting means from said shutter in response to energization of said electromagnet.

9. A combination as defined in claim 8, wherein said control means further comprises a thyristor having an anode and a gate, a normally closed first switch in the anode circuit of said thyristor and a normally open second switch in circuit with said drive means, said electromagnet being connected in the anode circuit of said thyristor and said timer means being arranged to transmit said signals to the gate of said thyristor, said armature being arranged to open said first switch in response to energization of said electromagnet to thereby turn off said thyristor and to close said second switch to thereby actuate said drive means.

10. A combination as defined in claim 9, further comprising a holding circuit for said electromagnet, said holding circuit including capacitor means arranged to maintain said electromagnet in energized condition for a predetermined interval of time following the opening of said first switch by said armature.

11. A combination as defined in claim 1, wherein said control means further comprises normally open switch means connected in circuit with said drive means to start said drive means in response to each manipulation of said selector means whereby said drive means changes the position of said shutter.

12. A combination as defined in claim 1, further comprising master switch means for completing the circuit of said timer means in response to adjustment of said shutter to assume said second position.

13. A combination as defined in claim 1, wherein said shutter is a rotary shutter having a single blade and said drive means comprises a shaft supporting said blade and having means for operating said mechanism.

* * * * *